Jan. 20, 1925.  
A. M. BEAM  
1,523,682  
MULTIPLE RETORT ORE AND OIL SHALE ROASTING FURNACE  
Filed Feb. 17, 1920   6 Sheets-Sheet 1
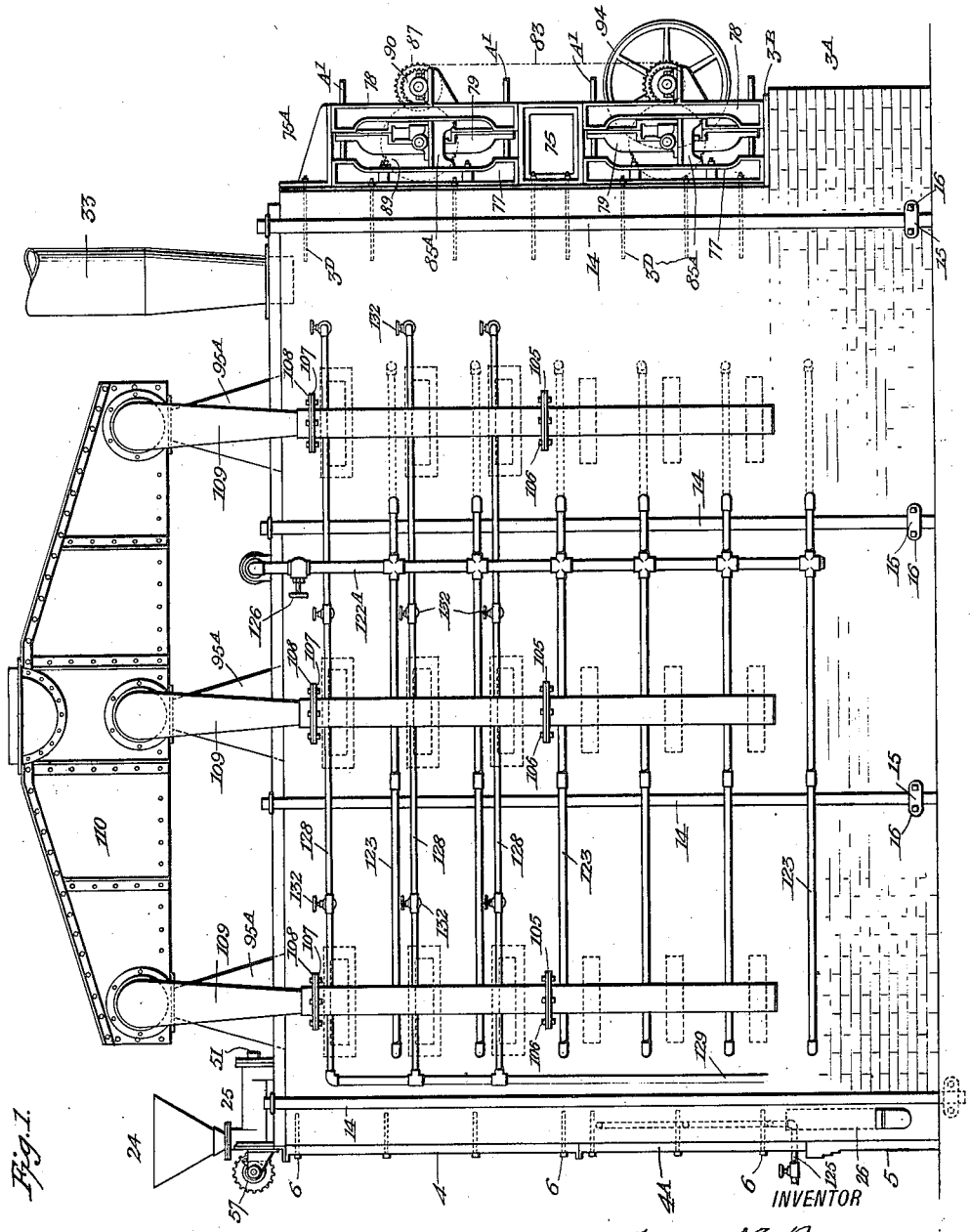
INVENTOR
Aron M. Beam.
BY
H. S. Bailey.   ATTORNEY

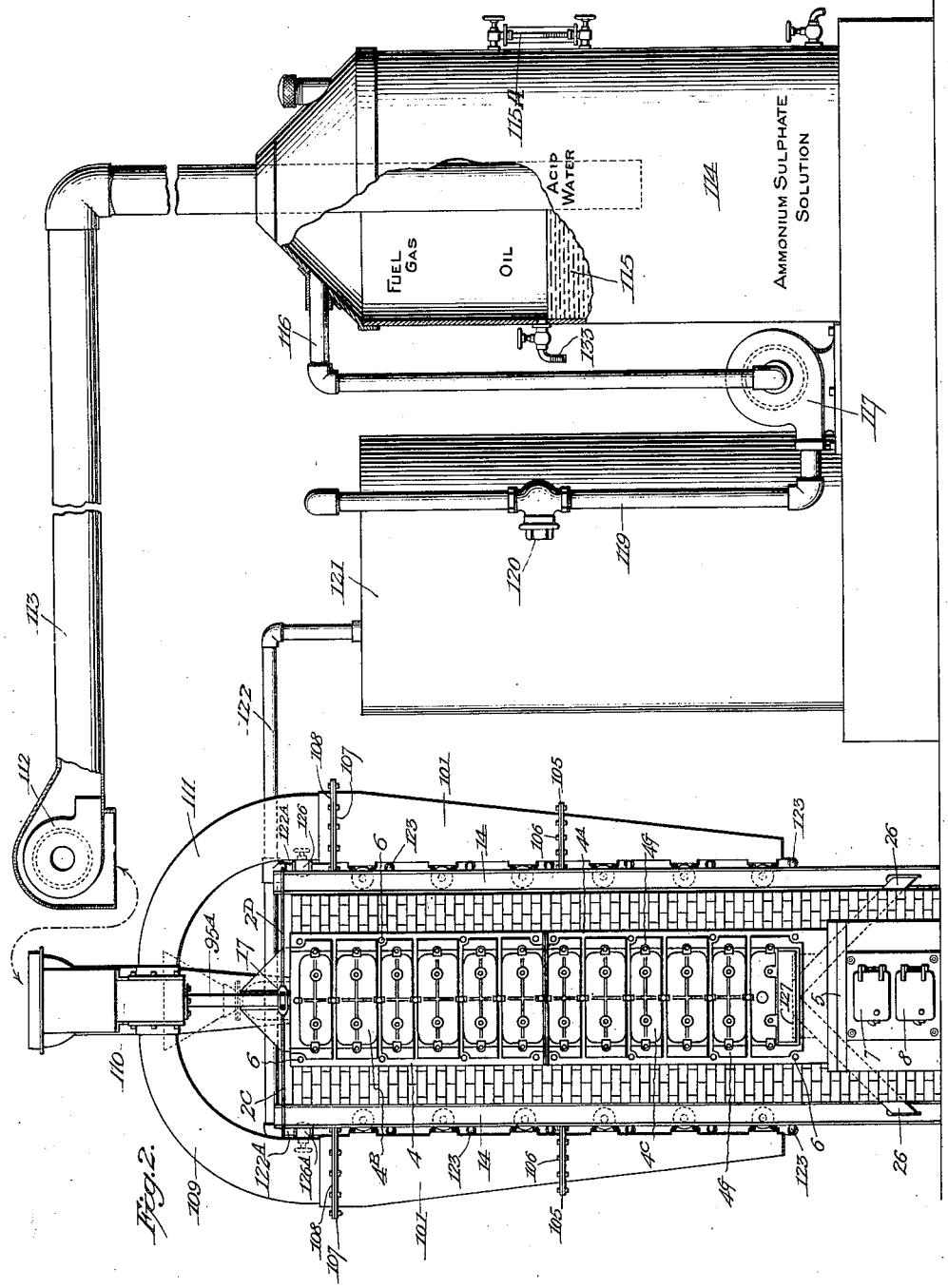

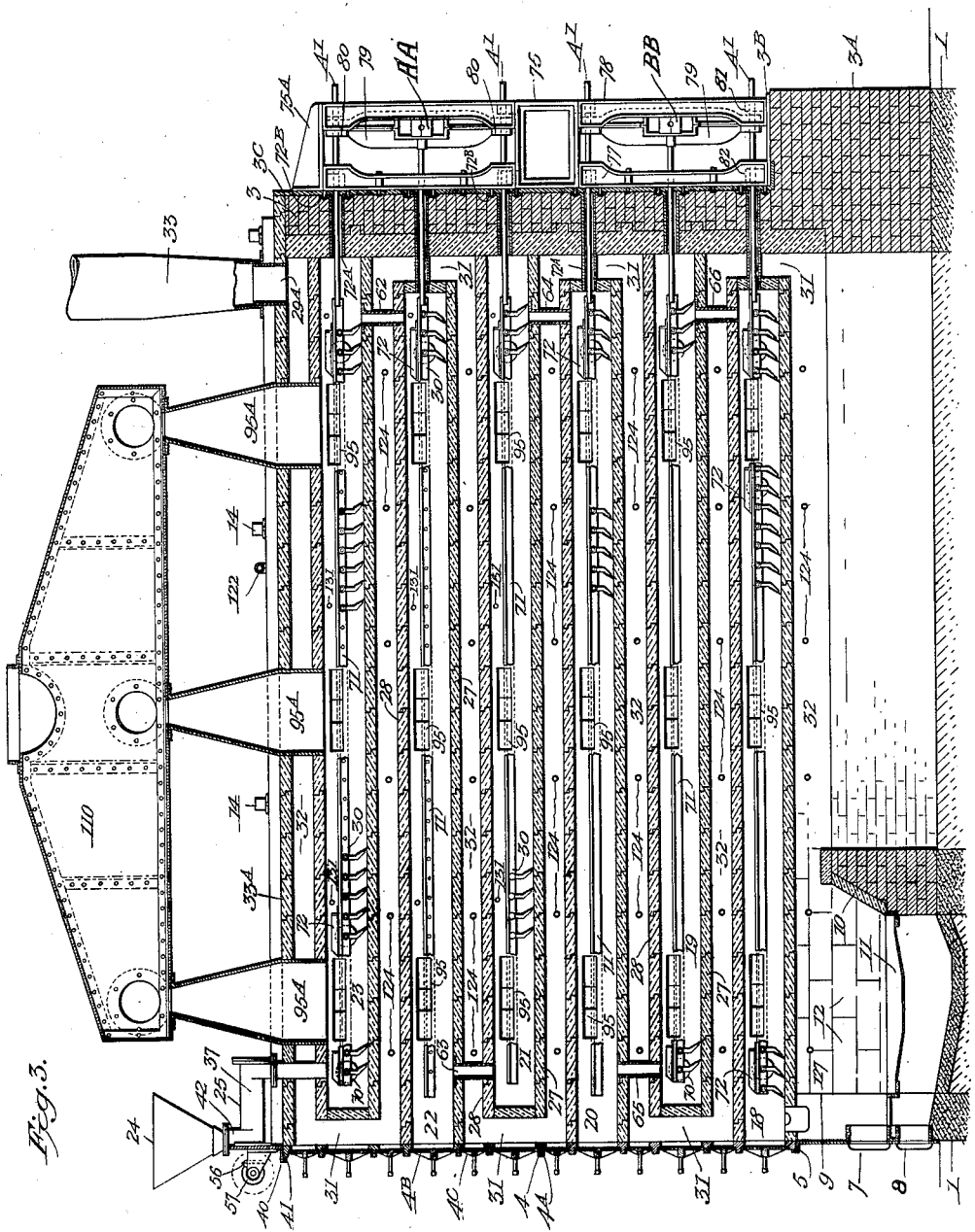

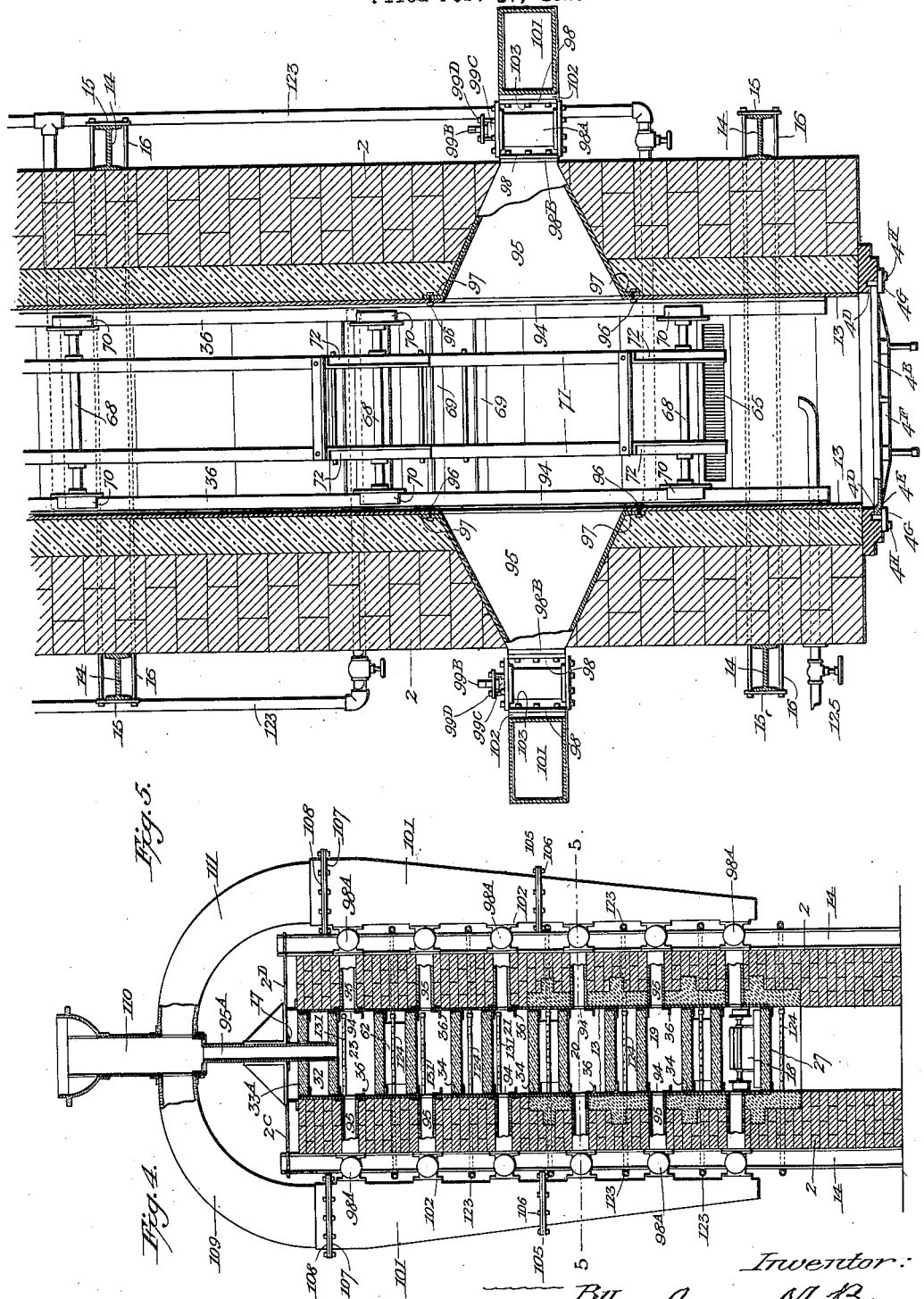

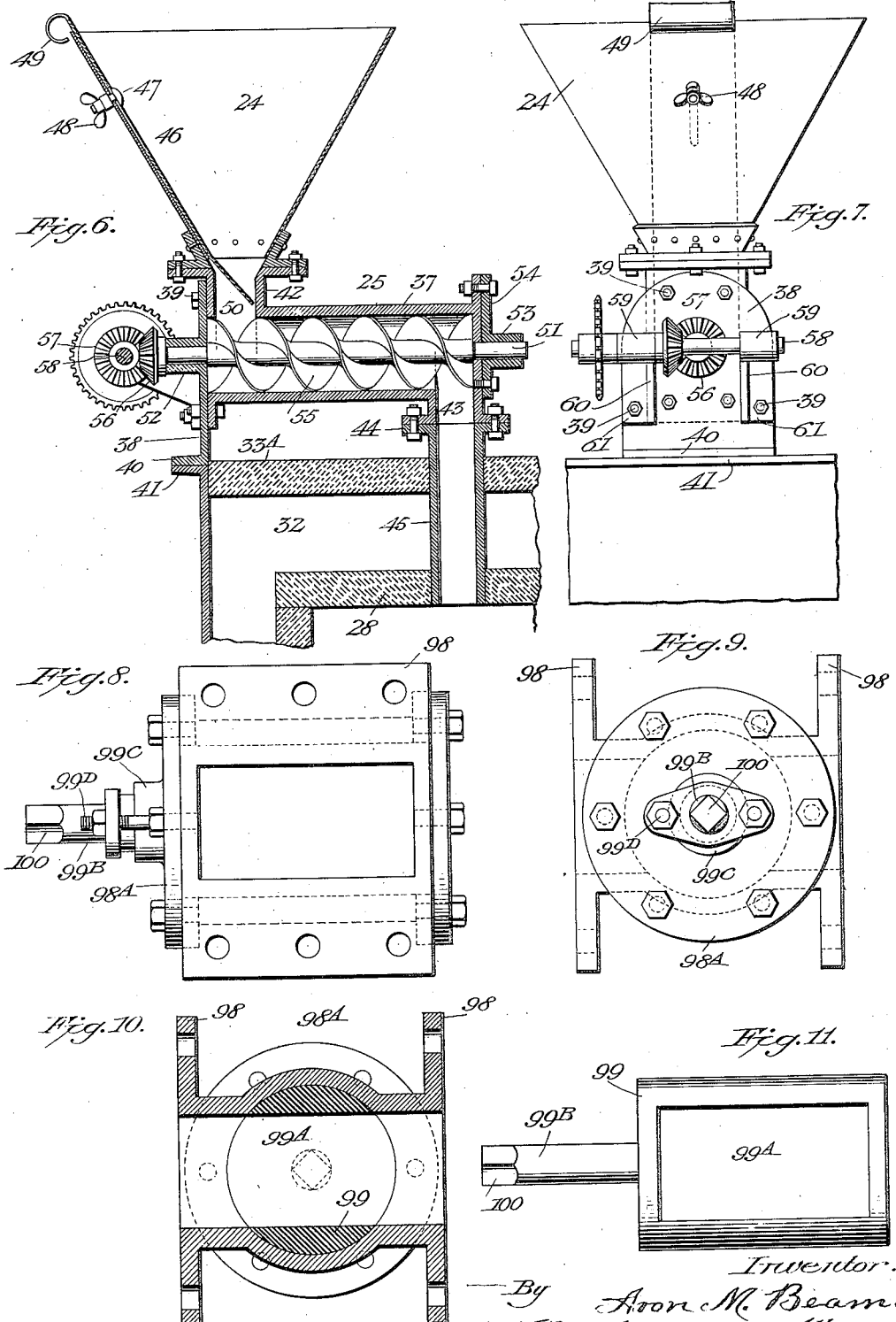

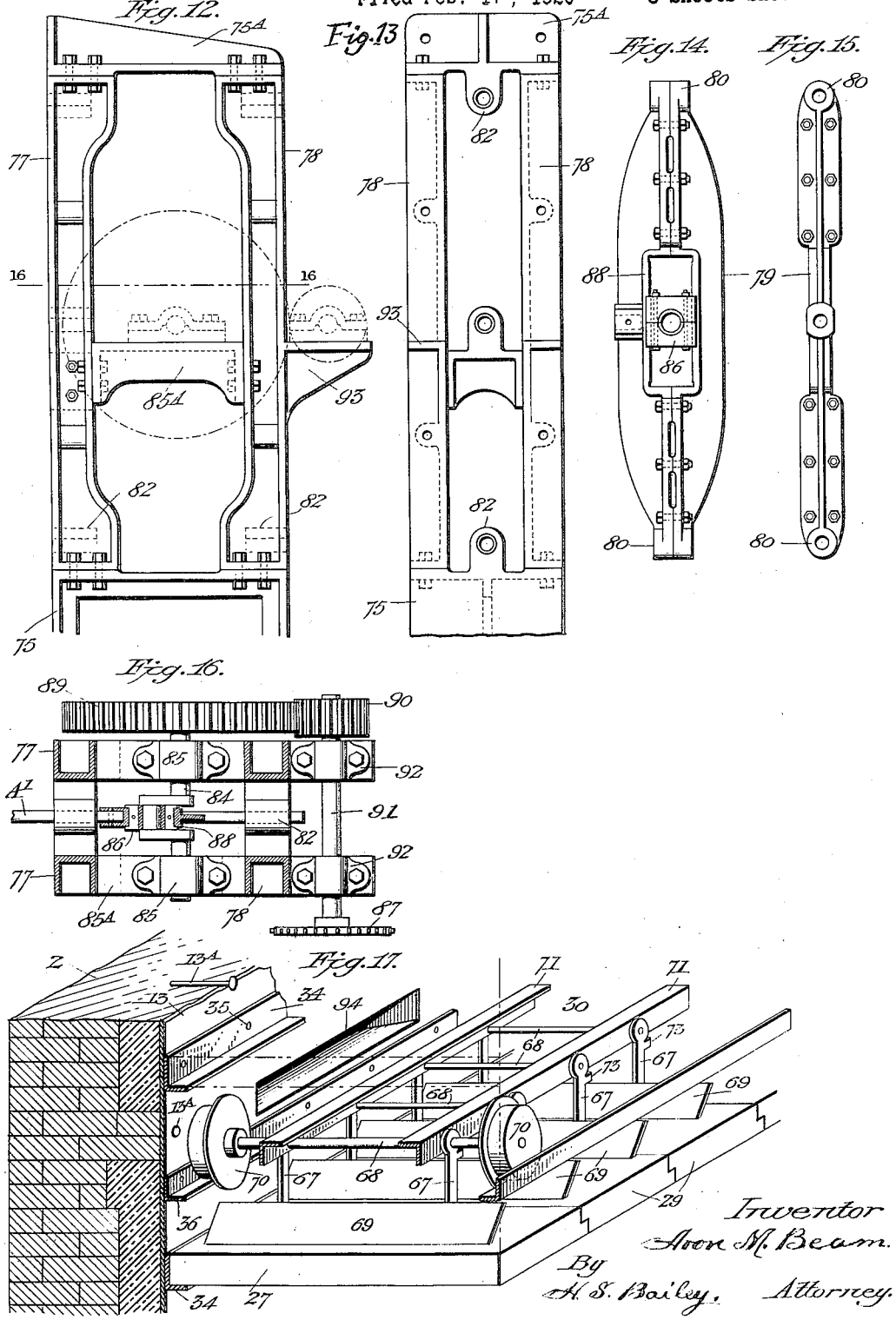

Patented Jan. 20, 1925.

1,523,682

UNITED STATES PATENT OFFICE.

ARON M. BEAM, OF DENVER, COLORADO, ASSIGNOR TO THE AMERICAN CONTINUOUS RETORT COMPANY, OF DENVER, COLORADO.

MULTIPLE-RETORT ORE AND OIL-SHALE ROASTING FURNACE.

Application filed February 17, 1920. Serial No. 359,435.

*To all whom it may concern:*

Be it known that I, ARON M. BEAM, a citizen of the United States of America, residing in the city and county of Denver, and State of Colorado, have invented new and useful Multiple-Retort Ore and Oil-Shale Roasting Furnaces, of which the following is a specification.

My invention relates to a new type of multiple retort roasting furnace for roasting oil-shales and also for roasting ores.

The objects of my invention are:

First. To provide a new type of muffled retort roasting furnace that contains a multiple number of retorts, into and through which crushed ores by themselves, or oil-shales by themselves, are fed progressively and continuously forward from the upper retort through all of the retorts and are discharged from the lower retort, and in which the upper retort, or group of retorts, is provided with means for giving to ores, or to oil-shales, such a roasting treatment as will remove their volatile elements; and in which the lower retort, or group of retorts, is provided with means for giving to the ores, or to oil-shales, cold or hot intermittent atmospheric air and indirect heat treatment as will decompose the sulphides that are present in refractory sulphide ores and oil shale containing metal values.

Second. To provide a multiple retort roasting furnace that is adapted to roast oil-shales so that their oil and ammonium sulphate and fuel gas contents can be recovered therefrom.

Third. To provide a multiple retort roasting furnace that is adapted to roast oil-shale that contains gold and other metal values, so that the gold and other metal values can be recovered by further treatments, from the roasted oil-shales.

Fourth. To provide a multiple retort roasting furnace in which fissure and load vein, gold, silver, copper, lead, zinc and other valuable metal carrying ores can be so roasted by themselves, independently of oil-shales, that their metallic values can be individualized by volatilizing, separating and discharging from them their sulphur, arsenic, antimony and other volatile elements, and also removing from them their fixed carbon elements, so that after they are discharged from the furnace, their metal values can be recovered in commercially usable forms by further treatment.

Fifth. To provide a multiple retort roasting furnace that is adapted to roast oil-shales carrying gold and other metal values, and that is provided with several retorts, each of which contains an ore rabbling and scraper mechanism; the ore rabbling and scraper mechanism of the three upper retorts being operated bv an independent operating mechanism from that which operates the lower three; and both mechanisms being operated by one power transmitting machine.

Sixth. To provide an ore oil-shale roasting furnace, provided with a multiple number of muffled retorts, arranged one above the other and provided with an ore inlet aperture and a power operating force feeding device that is arranged to feed ore into the upper retort, and to so pack and choke the ore in the inlet aperture that the ore completely closes and seals the ore inlet so that the gases generated in the upper retort cannot escape through the ore inlet aperture, said retorts being provided with reciprocating rabbling mechanism arranged to feed the ore from the forced ore feeding device through all of the retorts to the lowest, in successive order, said lowest retort being provided with discharge spouts at its discharge end arranged to discharge the treated ore from opposite sides of the machine simultaneously.

Seventh. To provide a multiple retort roasting furnace for either ores, or for oil-shales, that is provided with a plurality of muffled retorts arranged one above the other between suitable supporting walls that contain a fire box and flues leading around and between said retorts, to a smoke stack, and that is provided with a system of pipes arranged to convey the gases and vapors formed in the retorts, into a water provided tank, and to provide means for separating said gases and vapors into fuel gas, ammonium sulphate and petroleum oil, and to provide means for collecting and using the fuel gas for heating said retorts.

I attain these objects by the mechanism illustrated in the accompanying drawings, in which:

Figure 1 is a side elevation of the improved continuous ore and oil shale retort.

Fig. 2 is an end view thereof, also showing the gas separating and gas storing tanks connected therewith.

Fig. 3 is a vertical, longitudinal, sectional view of the retort.

Fig. 4 is a transverse, vertical, sectional view of the same.

Fig. 5 is an enlarged, horizontal, sectional view through a portion of the retort, on the line 5—5 of Figure 4.

Fig. 6 is a vertical, longitudinal, sectional view of the feed mechanism for delivering material to the upper chamber of the retort.

Fig. 7 is a front view of the same.

Fig. 8 is a front view of one of the valves which connect the retort chambers with gas or vapor flues which convey the gas or vapor away from the retort.

Fig. 9 is a side view of the same.

Fig. 10 is a vertical, sectional view thereof.

Fig. 11 is a side view of the cut-off for the said valve.

Fig. 12 is a side view of the frame which supports the driving mechanism for the rabblers.

Fig. 13 is a front view of the same.

Fig. 14 is a side view of the reciprocable cross head, which is secured to connecting rods leading from the rabbler supporting frames.

Fig. 15 is a front view of the same.

Fig. 16 is a horizontal, sectional view on the line 16—16 of Figure 12, showing parts omitted in the said Figure 12.

Fig. 17 is a sectional perspective view, showing a portion of one of the rabblers, together with a portion of one of the side walls of the retort, the angle bars connected thereto for supporting the floors and ceilings of the chambers and those which act as tracks for the rabbler-supporting wheels.

Similar letters of reference refer to similar parts throughout the several views.

Referring to the drawings:

Figures 1, 2 and 3 illustrate the most important views of an ore and oil shale roasting and replacement furnace.

In these several views and also in the detail views of the drawings, the numeral 1, designates the foundation portion of the furnace, which is preferably made of concrete. On this foundation I build the side walls 2, and the rear wall 3, which are constructed of brick, and the front end wall which is constructed of cast iron plates 4 and 4$^A$ and 5, all three of which overlap and are secured to the adjacent ends of the side walls 2, by bolts 6.

The two upper front end plates 4 and 4$^A$, cover the adjacent ends of the retorts, and the plate 5 is the fire box door frame and contains the fuel entrance door 7, and the ash pit entrance door 8.

A fuel consuming fire box 9, is formed at and above the foundation by a fire wall 10, and by grate bars 11, that extend from between the fuel and ash pit doors to the fire wall.

The parts of the inside surfaces of the brick walls of the furnace that receive the hottest heat from the fire box are lined with fire brick 12.

The interior surfaces of the opposite side walls 2, of the furnace are lined with metal plates 13, of about one-fourth inch thickness, which are preferably made out of rolled sheet iron, but cast iron plates may be used if desired. These plates are bolted to the side walls by bolts 13$^A$, and these plates 13 form the opposite sides of each one of the retorts.

The opposite sides of the furnace are secured together against the heat expanding temperature, by buckstays 14, that are preferably made out of I-beams, and extend from the foundation above the furnace and are placed against the outside surface of the brickwork and are clamped to the lower portion of the furnace by straps 15, and bolts 16, that are placed on opposite sides of I-beams and extend through the straps and through the furnace near its foundation. The upper ends of the buckstays are clampingly secured against the brick sides of the furnace by two rods 2$^C$, and 2$^D$, the outer ends of which are looped over the upper ends of the buckstays, and their inner ends are connected by a turn-buckle 17. A number of these buckstays are placed at equal distances apart through the length of the furnace.

The rear brick wall 3, is provided with a laterally projecting brick pier portion 3$^A$, on which a plate 3$^B$, is placed, and on this plate 3$^B$, the lower end of a plate 3$^C$, rests. This plate 3$^C$, extends from the top of the pier to the top of the furnace and it is bolted to the brick wall 3, by bolts 3$^D$, and it is arranged and adapted to support the driving mechanism of the reciprocating rabbling apparatus and its operating mechanism, as will be fully described hereinafter.

My multiple retort furnace contains, as illustrated, six retorts 18, 19, 20, 21, 22, 23. Inasmuch as my present type of furnace requires that there be given to the ore carrying oil shales two different kinds of treatment, it is preferably necessary that the furnace consist of either two, or four, or six, or eight, or ten, or more pairs of retorts, in order that if but two retorts are used, the ore oil shale may receive the two different treatments I give to it; that is, one kind of treatment in the upper retort and the other kind of treatment in the lower; and where four retorts are used, then one kind of treatment is given in the two upper retorts and the other kind of treatment is given in the lower two retorts.

In my present illustrated furnace of six retorts, the ore oil shales are fed into the upper retort through a feed hopper 24, and a force feeding device 25, and they receive one kind of treatment in these three upper retorts as they are moved through them, and an entirely different character of treatment as they are moved through the lower three retorts to the discharge outlet spouts 26, which are placed at the front end of the lowest retort close to the front end of the furnace.

Of course a furnace could be built with three retorts in it, and one of them could be used for one kind of treatment and the other two retorts for the other kind of treatment. I preferably use, however, the retorts in pairs for the two different kinds of treatment I give to ore oil shales.

The particular characters of these two different kinds of treatments that I give to the ore bearing oil shales will be fully described hereinafter.

Each of the six retorts in my present illustrated furnace consists of a floor portion 27, and a roof portion 28, both constructed of overlapping stepped-ended fire clay slabs 29. The floor and roof portions of each retort are placed at preferably about sixteen inches apart in order to provide ample roasting space within them, and also room for a reciprocating rabbling mechanism 30, which will be fully described hereinafter.

Each retort extends up against either the inside surface of the front end plate of the furnace or up against the inside surface of the rear end brick wall of the furnace; that is to say, the lowest retort 18, extends tightly up against the inside surface of the front end plate 4$^A$, and the next retort above it extends tightly up against the inside surface of the rear end brick wall 3, and all of the retorts are arranged in this alternate manner up to the top of the furnace.

Each retort is arranged in a horizontal plane throughout the length of the furnace, but each retort ends at its opposite end from its ore receiving end, and that is at its ore discharging end, far enough from the adjacent inner wall of the front or rear end (as the case may be) of the furnace, to form a clear flue space 31 around the end of the retort. Thus the lowest or first retort above the fire box extends throughout the length of the space between the opposite ends of the furnace to within a short and sufficient distance from the inside surface of the rear wall 3, to form the flue space 31, around its end and between it and the rear wall, and the second retort 19, extends from against the rear wall throughout the whole length of the furnace horizontally, parallel to the first retort 18, but ends at a sufficient distance from the front plate 4$^A$, to form a flue around its end, and this second retort 19, is placed far enough above the lowest retort 18, to form a flue space 32, between them. This alternate and oppositely arranged beginning and ending arrangement of the retorts continues at a flue space apart horizontally and at a flue space apart at one end, in alternate order as shown in the longitudinal section in Figure 3, in order to form a continuous flue for the passage of the heat and waste products of combustion generated in the fire box under and over and around one end of each retort to the smoke stack 33, with the upper horizontal flue space 32, that is formed above the upper retort 23. The ends of the retorts that do not reach to either one or the other of the ends of the furnace are closed by a slab of fire clay, and any cracks or crevices between the slabs of fire clay or between the ends of the retorts and the inside surfaces of the front end plates 4 and 4$^A$, or the rear wall 3, are made air and gas tight by stopping them up with plastic fire clay or any other fireproof clay or non-heat affecting cement.

The horizontal flue 32, extends from the fire box under the lowest retort 18, to the rear end wall of the furnace. This lower flue occupies all of the space between the lower retort and the floor line of the furnace.

The furnace is provided with a roof 33$^A$, that is preferably made of fire clay slabs, and it is placed high enough above the upper retort 23, of the furnace to form a horizontal flue between it and the roof of the upper retort 23, that is a continuation of the end flue 31, that extends around the end of this upper retort; and this upper horizontal flue 32, extends to the rear end of the furnace where it connects with an aperture 29$^A$, through the roof to which the smoke stack 33, is connected. Consequently the products of combustion flow from the fire box through the lower horizontal flue 32, around its rear end, through the end flue 31, into the second horizontal flue 32, between the lowest retort 18, and the next retort above it 19, and through the end flue 31, and around its end, and so on between and around the ends of all of the retorts to the smoke stack.

All of the roofs and floors of the retorts are supported between the side plates 13, that form the opposite sides of each retort of the furnace, on angle irons 34, which are bolted to the side plates 13, by bolts 35.

The side walls of the furnace and the metal plates 13, are so arranged that the fire clay slabs fit snugly between them and any cracks or crevices between their edges, and the plates are stopped up with fire clay or other cement.

Along the opposite inside surfaces of the side plates 13, of each retort, just above the center of its inside height, an angle iron 36, is secured, which forms tracks along the opposite sides of each retort, on which the wheels of a reciprocating ore and oil shale rabbling and progressively moving apparatus are mounted. This rabbling apparatus forms an essentially valuable cooperating feature of my invention, and it is arranged to continuously and automatically feed the ore and oil shale through the furnace from the instant it enters the furnace through the hopper 24, on the roof of the furnace and through the positive feeding and gas sealed ore and oil shale feeding device 25, into the front end of the upper retort 23, until it is discharged from the front end of the lowest retort through the discharge spouts 26.

This ore feeding device comprises a cylindrical casing 37, that is secured to a plate 38, by bolts 39; the lower end of the plate is provided with an outwardly projecting foot flange 40, that rests on an outwardly projecting cap flange 41, that is formed on the top of the front plate 4, of the furnace.

The casing 37, extends from the front end of the furnace, and is long enough to discharge the pulverized ore oil shale into the front end of the upper retort 23, and it is provided with an upwardly projecting inlet spout 42, at its front end, and with a downwardly projecting discharge spout 43, at its inner end, the lower edge of which is provided with a flange to which a similar flange 44, is bolted, which forms the top of a spout 45, that extends down through and fits closely in an aperture that is formed through the roof of the upper retort.

A hopper 24, is secured to the inlet spout of the feeding device, and it is provided with a sliding gate 46, that is normally clamped in an open position against the inside of the hopper by a combined clamping bolt 47, and a thumb nut 48; the upper end of the sliding gate is provided with a finger loop 49, by which the gate can be lowered or pushed down when freed, by loosening the thumb screw to close the ore oil shale inlet 50, at the lower end of the hopper, which tapers to a point in the inlet spout 42.

The casing is provided with an axial shaft 51, that is rotatably mounted in hub members 52 and 53, at its opposite ends. The front hub is formed on the plate 38, and the rear hub is formed on a plate 54, that is bolted to the end of the casing.

The shaft is provided with a thin blade form of a screw conveyor 55, that fits closely but rotatably, the bore in the casing. The front end of the shaft 51, extends beyond the hub 52, and a bevel pinion 56, is secured on it. This pinion is engaged by a bevel gear 57, that is secured on a shaft 58, that is rotatively mounted in hubs 59, that are formed on brackets 60, that are provided with flanges 61, that are bolted to the plate 38.

My feed hopper is adapted to form a force feed and at the same time a seal against the escape of the gases from the top retort 23, and it accomplishes this feature from the fact that the pulverized ore oil shale which is preferably crushed to from about twenty to thirty mesh, packs the feed cylinder and the space between the blades of the screw conveyor so full of the ore that the gas cannot get through it; and the speed of the rotary feeding movement of the conveyor is such as to maintain the cylinder and the screw full of the ore all of the time, and the ore is fed into the discharge spout and drops onto and piles upon the floor of the retort and keeps it supplied with ore enough to keep the scrapers of the rabbling apparatus provided with ore which they move forward from the inlet spout to the rear end of the upper retort, and from which it discharges through a down spout 62, into the retort 22, next below from which it is moved to the front end of the retort 22, and discharges from it through a down spout 63, into the retort 21, below and through it to the down spout 64, into the retort 20, and through it into the down spout 65, into the retort 19, and through it into the down spout 66, into the retort 18, and through it to the two oppositely divergingly arranged discharge spouts 26 out of the furnace.

The ore is moved through the six retorts in short reciprocating strokes by a rabbling device 30, that is placed in each retort, the scrapers of each one of which, on each of its reciprocative strokes that do not move the ore forward, are arranged to lift up and drag backwardly over the top of the ore. The rabbling devices, however, in all six of these retorts are operated in reciprocal unison together, and in the upper, third and the fifth retorts they move the ore towards the rear end of the furnace, while in the second, the fourth and the sixth, the rabbling device moves the ore towards the front of the furnace.

The six rabbling devices are operated from two different driving mechanisms, but they are connected and operate in unison as one driving or reciprocating mechanism, and they are arranged to be operated from an overhead belt power transmitting shaft, or from a motor positioned on the floor or foundation line of the furnace.

The rabbling devices 30, of each retort and their reciprocating mechanisms are connected and arranged as follows:

The scrapers comprise two arms 67, that are mounted loosely on axles 68, to swing thereon, that extend across the inside width of the retort to close to their side plates 13, and on the lower ends of each of the arms 67, a shoveling blade 69, is secured, and on the opposite ends of the axles, flanged wheels 70, are rotatably mounted, which have a short rolling motion on the angle iron tracks 36, that are secured to the plates 13, on the opposite sides of each retort.

The axles 68, extend loosely through and transversely across the two long angle irons 71, that extend the whole length of each retort, and these two angle irons are spaced far enough apart to support the axles adjacent to their wheels, and at the sides of the arms of the ore scrapers or shoveling blades 69, adjacent to each wheel, a trussing and stiffening plate 72, is secured to the angle irons over three of the adjacent axles.

The ore shoveling or pushing scraper blades 69, are set at a forwardly inclined angle, and they are provided with a stop lug portion 73, which engages the lower edges of the angle irons 71, and prevents them from swinging downward below the level of the floor of the retort when they are moving in the direction to scrape the ore progressively forward through the furnace, but they are free to move upwardly above the floor and to ride up over the ore on the backward strokes of their reciprocal movements.

At the rear end of the furnace, each ore rabbling scraper mechanism is connected to a rod $A^1$, that extends loosely through a sleeve $72^A$, that is embedded in the brick work and that is provided with a flange $72^B$, that is bolted to the plate $3^C$, and there is also an aperture through the plate in alinement with the hole through the sleeve $72^A$, through which the rod $A^1$ extends. All of these rods $A^1$ extend to the two power driven scraper reciprocating mechanisms AA and BB. The three upper retorts have their scraper rods $A^1$, connected to the upper reciprocating mechanism, and the three lower retorts have their scraper rods connected to the lower reciprocating mechanism.

The two power driven scraper mechanisms are arranged one above the other, in vertical alinement, and they are both secured to the rear end plate $3^C$. The lower one rests on the plate $3^B$, that sets on top of the brick pier $3^A$, and its upper end is secured to a bracket 75, that is bolted to the plate $3^C$.

Each of these power driven scraper reciprocating mechanisms consists of vertical channel bars 77 and 78, that are secured to the plates $3^B$ and $3^C$, and the brackets 75, and a horizontally reciprocating sliding frame 79, that has a reciprocal movement between the channel bars 77 and 78. These channel bars are secured between the outer ends of the brackets $75^A$, of the upper reciprocating mechanism and between the bracket 75, and the base plate $3^B$, of the lower reciprocating mechanism.

These two power driven scraper reciprocating mechanisms are connected to the rearwardly projecting rods $A^1$, of the rabbling devices of the several retorts, in the following manner.

The rods $A^1$, of the upper three retorts 23, 22 and 21, are arranged as follows: The rods of the two retorts 23 and 21, are connected to hubs 80, that are formed on the upper and lower ends of the horizontally reciprocating frame 79, and these rods extend through the hubs 80, that they are fastened to, and extend slidably through and their outer ends are supported by hubs 82, that are formed upon the upper bracket $75^A$, and upon the brackets 75.

The scraper rods $A^1$, of the lower three retorts 18, 19 and 20, are arranged in a similar manner, the rod $A^1$, of the scrapers of the center retort 19, being secured to the center of the horizontal frame 79, and the rods $A^1$, of the retorts 18 and 20, being secured to the hubs at the top and lower ends of this frame 79, and extending slidably through the hubs 82, on the bracket 75, and on the plate $3^B$.

The vertically arranged horizontally reciprocating frames 79, are reciprocated by a crank shaft 84, that is mounted in bearings 85, that are secured upon horizontal brackets $85^A$, that are bolted to the channel bars 77 and 78. A cross-head 86, is pivotally mounted on the crank pin of this crank shaft, and the cross-head is slidably mounted in the slideway 88, that is formed in the vertical frames 79, of the two reciprocating mechanisms.

The crank shaft is provided with a gear wheel 89, that meshes with a pinion 90, that is mounted on a counter shaft 91, that is journaled in bearings 92, that are secured to brackets 93, that are formed on the channel bars 78, and on the end of the counter shaft 91, a sprocket wheel 87, is secured, and a similar counter crank-shaft, cross-head and gear, pinion and sprocket wheel is formed on each reciprocating mechanism, and the two sprocket wheels are connected together by a sprocket wheel chain 83. A belt pulley 94, is illustrated mounted on the outer end of the lower sprocket wheel and pinion shaft of the lower reciprocating mechanism, and is used when it is desired to rotate this pulley from motor placed on the floor; but if it is desired to rotate the scraper reciprocating mechanism from an overhead belt, then this belt pulley is preferably placed on the end of the upper shaft of the upper reciprocating mechanism.

The cross-head 86, is divided into two parts which fit over the crank pin of the crank shaft, and the two parts of the cross-head are bolted together around the crank pin. The crank shaft and also the sprocket wheel and pinion shaft extend across and beyond the opposite sides of the fixed channel bars-between which the frame 79, reciprocates, far enough to receive the gears and the sprocket wheels and the driving pulley, which, when rotated, rotates the counter or sprocket and pinion shaft on which it is secured, and through the medium of the sprocket chain and the sprocket wheel on the other counter shaft, rotates the other pinion shaft in unison with it; then these pinion gears of both of these counter shafts rotate the large gears of the crank shaft, which, as it rotates, reciprocates in a horizontal plane the frame 79, between the vertical channel bars and as the rods A¹, that extend rearwardly from the scrapers slidably through the hubs 81 and 82, at the upper and lower ends of the channel bars, are fastened to the upper and lower ends of the frame 79, these rods and the scrapers mechanisms are reciprocated by it.

The bracket 75, between the upper ends of the lower driving mechanism and the lower ends of the upper driving mechanism is in the form of a supporting block, which rests on the lower frame, and the weight of the upper frame rests on and is supported by this block, which is bolted to the wall plate 3ᶜ.

The plates 4 and 4ᴬ, that form the central part of the front end of the furnace, are provided with doors 4ᴮ and 4ᶜ. The doors 4ᴮ are placed over openings in these plates that are formed opposite to the adjacent end of the retorts, and the doors 4ᶜ, open into the flues between the retorts. The edges of these plates 4 and 4ᴬ, are raised to form a flat-topped lug 4ᴰ, and the doors are formed with a rim portion 4ᴱ, and the meeting faces of the rims of the doors and of the raised lug around the doors are machine finished and ground to make an air tight joint between them. The outside surfaces of the doors are provided with cross ribs 4ᶠ, and a couple of hand grasping wrought iron rods, preferably headed bolts, are cast in these ribs to form handles that enable workmen to raise and lower them when it is desired to remove them. The doors are all clamped against the rim lugs of the plates by buttons 4ᴳ, that are bolted at one end to the plates by bolts 4ᴴ, and the other ends of which are made to swing over onto the doors close to the ends of the adjacent ribs of the doors as shown in Figure 5. Then when the bolts 4ᴴ are tightened, the buttons clamp the opposite ends of the doors to the rim lugs of the plates 4 and 4ᴬ.

The two rabbling scraper mechanisms consequently operate in unison, and they operate to simultaneously move all of the scrapers at the same time and also to move them all in the same direction; that is, they are all moved towards the front end of the furnace at one and the same time on the forward stroke of the reciprocating frame 79, and they are all moved towards the rear end of the furnace on their reverse stroke at the same time, and the length of the reciprocating strokes is sufficient to decidedly move the ore progressively through the furnace from the front end of the upper retort 23, which the ore enters at its front end through the feed hopper 24, through which the scrapers move the ore towards the rear end of this retort 23, to the downward discharge spout 62 through which it falls into and onto the floor of the retort 22 in which the scrapers move the ore towards the front end of this retort to its discharge spout 63 through which it falls into the retort 21 where the scrapers move it through this retort 21, to its discharge spout 64, from which it falls into and onto the floor of the retort 20 where the ore is moved in the opposite direction to that in the upper retort 23, and this alternate order of ore feeding movement continues to the discharge spout 26, of the lowest retort 18.

Each one of these six retorts is provided on its opposite sides with rectangular shaped outlet apertures 94, that are formed through its side plates, and to the outside surface of these plates one end of a pipe 95, is secured by bolts 96, that extend through a flange portion 97, that is formed on the end of the pipe.

The pipe 95, tapers convergingly from the outlets of the retorts to a small end that is secured to a flange 98, formed on a valve 98ᴬ, by bolts that extend through a flange 98ᴮ, that is formed on the end of the tapering pipe.

This valve 98ᴬ, is a straight line cylindrical type of valve, and it contains a cylinder in which a round piston 99, is rotatively fitted. The piston is provided with a port 99ᴬ, that is formed diametrically through it. The piston is provided with a valve stem 99ᴮ, that extends through a stuffing box 99ᶜ, to which a sleeve is adjustably secured by studs and nuts 99ᴰ, that tighten the packing material that is put into the stuffing box around the piston. The valve stem is provided with a square end 100, by which the piston valve is turned to close the passage through it, of gas from the retort and the adjacent tapering pipe 95, to a vertical pipe 101, on the side of the furnace. The opposite end of the valve is also provided with a flange 98, that is secured to a similar sized boss portion 102, by bolts 103, that are formed on the adjacent side of vertically positioned pipes 101, of which there are three on each side of the furnace, that extend from the lower retort upwardly and along the side of the furnace to the top of the furnace, and which taper larger in size progressively to their upper ends. The tapering vertically positioned pipes are each preferably made in two lengths and are provided with flanges 105, that are secured together by bolts 106. The top portions of these pipes are also provided with a flange 107, that is bolted to a similar flange 108, that is formed on the end of a curved pipe 109, that curves up, over and a short distance above the furnace and is bolted to the adjacent side of an elongated gas reservoir tank 110, to the opposite side of which a similarly curved pipe 111, is bolted, and which extends and is secured to the top of the tapering pipe at the opposite side of the furnace.

The gas reservoir 110, receives the gases from the center and the opposite end portions of all of the retorts in the furnace, through the three vertical pipes 101, on both sides of the furnace.

Besides the six lateral gas outlets 95, of the top retort 23, three additional gas outlets extend through the ceiling of the said retort, and are connected with the gas reservoir 110, by pipes 95^A. These additional outlets, together with the outlets 95, provide ample means for carrying off a great quantity of gas, which naturally accumulates in the topmost retort. At the top of the gas reservoir a combined suction and pressure blower 112, is mounted, that is adapted to be rotatively driven by any suitable power transmitting belt or other mechanism.

From this blower 112, a pipe 113, extends to and enters a tank 114, and extends below the surface of a body of water 115, that is maintained in the tank at a little more than one-half of its height. A water gage 115^A, is used to indicate its preferred height to height of the tank. A gas exit pipe 116, is connected to the top of the tank and extends to a blower 117, that draws the gas from the tank 114, and forces it through a pipe 119, in which a check valve 120, is placed, into a tank 121, that is solely a gas reservoir tank, and a pipe 122, extends from this gas reservoir tank to and over the top of the furnace, and connects with pipes 122^A, which extend down along the opposite sides of the furnace to the flue space below the lower flue 18, and to these main gas supply pipes 122^A, horizontally extending pipes 123, are connected at points in said main gas supply opposite to the center of each flue space between each of the retorts, and these horizontally extending pipes extend along the whole length of the furnace to within a short distance of its opposite end portions, and from these horizontal pipes branch lateral pipes 124, are extended through the walls of the furnace into the flue spaces between each retort. I preferably extend six of these lateral pipes into the flue spaces of the furnace and place them at equal distances apart from each other, and at a short distance from the opposite ends of the furnace.

The inner ends of the pipes 124, that enter the furnace through the brick work, are arranged on opposite sides of the furnace, and their terminal end portions extend across the width of the flues, and their ends are preferably closed, and they are perforated through that portion of their length that extends across the flues, with small holes, from which the gas is discharged in jets all the way across the width of the flues under the pressure of the blower 117, and this gas becomes ignited and burns and thus furnishes fuel for the heating of the flue spaces below and between the retorts and for heating the retorts; and after the furnace retorts are first heated up by a fire in the fire-box, this fuel gas is all the fuel that is needed to continuously heat the retorts when treating most oil shales. Valves 126 and 126^A, are inserted in these gas supply pipes to control its flow from the tank 121, and from the lateral pipes 124, into the flues of the furnace.

The discharge of the ore oil shale that has passed through the several retorts of my furnace is preferably effected through two separate and oppositely diverging metal spouts 26, that are arranged to receive the ore from a trough portion 127, formed in the floor of the front end of the lower retort 18, that opens into and forms a part of the upper ends of the spouts which are joined together at their upper inner end portions to freely receive the treated ore from the adjacent end of the scrapers mechanism of this lower retort.

These two ore discharging spouts are arranged to project at similar angles from the end of the lower retort to just beyond the opposite sides of the furnace, and doors are hinged to their ends that readily swing open to allow ore pressing against them to flow from the spouts, but keep the discharging ends of the spouts closed when ore is not flowing against them.

From the discharging ends of these spouts the treated ore is conveyed to various machines and tanks for further treatment to extract from it the gold, silver and other values that may be in the ore, which machines and tanks are not illustrated, as they do not form a part of my present invention.

The operation of my multiple retort furnace in treating oil-shales that do not contain gold or other metal values, and also of oil-shales that do contain gold and other metal values, and also when treating gold and other valuable carrying fissure vein ores, is as follows:

The ore shale is crushed to about from ten to thirty mesh, twenty mesh being the usual size that these characters of oil carrying shale rocks and metal containing ore rocks are crushed to, but occasionally an ore will require a finer crushing, or one will be found that will work just as well with coarser crushing than twenty mesh.

After crushing the ore, it is fed to the hopper 24, in any suitable conveyor, and from this hopper it flows into the forced feeding device 25, that may be driven by means of any suitable power transmitting device or mechanism that it is convenient to attach to its shaft 51. This power feeding device forces the ore into the front end of the upper retort 23, from which it is moved by intermittent reciprocating strokes of the scrapers of the rabbling mechanism to the rear end of this retort, where it falls through the discharge spout 62, into the rear end of the retort 22, which is the next retort below. The ore scrapers or shoveling blades 69, move the ore on one stroke of their reciprocating movement by scraping lightly against the floor of the retort, and thus move the ore towards the rear end of this upper retort of the furnace, and on the other stroke of their reciprocal movement, they ride up over the top of the ore, and these short reciprocal strokes of the scrapers are continuously given to the ore and they thoroughly rabble, turn over and mix the ore as it is moved through these six retorts in successive order from the upper retort 23, to the lowest retort 18, in alternate order of direction, beginning at 23, then through 22, 21, 20, 19 and 18, from which the ore discharges through the discharge spouts. I preferably feed the ore in such regular quantity that it will extend across the entire width of the floor of the retorts at preferably from one-quarter of an inch to a half inch in depth.

In the treatment of ore-oil shales in my continuous retort replacement furnace, I admit and give to the ores at predetermined periods of time, an oxygen or atmospheric air treatment. The ores, however, do not require this oxygen treatment except in the lowest three retorts. I introduce the air through valve controlled pipes 125, which are inserted through one side of the furnace into each of the three lowest retorts 18, 19 and 20 see Figure 1.

As above stated, I give to the three upper retorts a different chemical treatment than I do to the three lowest retorts. The treatment that is given in the three upper retorts consists of providing them with a valve controlled supply of moist steam, either continuously or at predetermined periods of time, which acts to soften the oil-shales and prevent them from sticking to the scrapers and also acts to quickly change the volatile elements in them into gases and to move the gases as fast as formed out of the retorts into gas collecting pipes. In order to accomplish this result I provide one side of the furnace with several steam supply pipes 128, which consist of a main steam supply pipe 129, that is arranged to be connected to a supply of steam under sufficient pressure to force the steam into the retorts, as preferably a substantially dry steam. This main steam supplying pipe connects with the horizontal pipes 128, at one end of the furnace, and the pipes 128 extend along the length of the furnace from near its front end, to within a short distance of its rear end, and from each of these three pipes 128, there extend three laterally projecting pipes 131, that extend into and through the brick wall, and through the side plate 13, of each of the three upper retorts into the interior of each of these three retorts.

These steam inlet pipes are preferably placed at three points in the length of these three upper retorts, and one is preferably placed to enter the front end portions of these retorts and one at a short distance from the rear end of the furnace and the other about half way between the two end steam inlet pipes.

Each of the lateral inlet pipes is provided with a steam regulating valve 132, by which the volume of steam that is to be admitted can be so regulated that more or less steam can be admitted to any one part of the length of each retort, or the full force and volume of the steam can be admitted to all parts of all of these upper retorts at any or at all times, as desired.

In the three lower retorts no steam is admitted, but in its place I admit fresh atmospheric air at predetermined periods of time, or all of the time, as conditions require its use to furnish the additional amount of oxygen to satisfactorily oxidize the refractory combinations in the ore as carbon, sulphur, antimony, and arsenic, that occur in the ore in chemical combinations, which treatment leaves the metal in the ores in a free condition in which condition they can be recovered individually, as described in my pending application, Serial No. 296,841, filed May 12, 1919, for a combined roasting replacement and solution recovery process for refractory ores; also see Letters Patent Number 1,299,661 issued to me April 8, 1919, for a continuous feed muffled ore converting and roasting apparatus.

My invention provides a new and perfected, combined ore and oil shale treating furnace in which the oil and all other volatile products and elements are changed into gases which are drawn by suction from the retorts through the side pipes into the gas reservoir, and are then forced into the tank 114, where the gases are discharged under the surface of the water therein, where condensation takes place and the oil rises to the surface of the water and is drawn off from time to time through a faucet 133, and is given further treatment at a refinery to recover such valuable elements as gasoline, benzine and any other products therein that it is desired to recover from it.

From the water in the tank into which the gases from the retorts are forced by the blower 112, fuel gas rises and collects at the top of the tank and is drawn out of the tank by the suction draft of the blower 117, and is forced into the flues of the furnace between the retorts through the perforations in the pipes 124, and this gas is used either as the only fuel or as an auxiliary fuel to the coal or other fuel used on the grates, in the fire-box under the lowest retort for heating the retorts.

To the water of condensation in the tank that receives the gases from the retorts I add about 2% of sulphuric acid, which solution will dis-associate the ammonium from the traveling gas and it will in this sulphuric acid water or solution become saturated with the ammonium and will precipitate itself as a powder to the bottom of the tank, and it is taken out of the tank from time to time, as it accumulates therein; but in place of allowing the ammonium sulphate to precipitate from the solution when it has attained the full limit of its saturation, it can be drawn from the tank into another tank where the ammonium sulphate can be precipitated from it.

The several metallic values that may be in an ore such as gold, silver and other metals can be recovered by the cyanide process, aided by amalgamation, concentration and other characters of treatments.

My improved ore and oil shale roasting retort furnace, as described in my present application, is a continuously operating furnace and can be made in any tonnage capacity in units of from about 25 to 100 tons each, per day, and as it uses the fuel gas it extracts from the oil shale, either as an auxiliary fuel or solely as fuel, the cost of fuel to operate it is practically reduced to that amount of coal or wood that is necessary to start it in full operation; and the several structural features of it are easily obtained, quickly made and easily applied, as the furnace is constructed and assembled and erected; and while I have illustrated and described the preferred construction and arrangement of its several different co-operating features, I do not wish to be limited to the construction and arrangement shown, as many changes might be made without departing from the spirit of my invention.

Having described my invention, what I claim as new and desire to secure by Letters Patent, is:

1. In a combined ore and oil shale roasting furnace, the combination of a furnace containing two sets of retorts, one set of retorts being arranged and adapted to give to oil shale a steam treatment, the other set of retorts being arranged and adapted to give to ore carrying gold and other precious metals a roasting treatment that will change the volatile elements of carbon, sulphur, antimony, arsenic, and such other volatile elements as may be in the ore, into their respective gases, and means for removing said gases from said retorts, and means for moving the ore or oil shale automatically through both sets of retorts in successive order of their arrangement in said furnace, the upper retort in said furnace being provided with an oil shale entrance and a hopper and a feeding device connected thereto, said feeding device being arranged to forwardly feed and pack the infeeding ore or oil shale in said aperture.

2. The combination in a multiple muffled retort ore and oil shale roasting furnace, containing two sets of retorts, means for rabbling and moving the ore oil shale progressively through the retorts of each set of retorts, said means comprising an independent scraper and rabbling reciprocating mechanism arranged to operate each set of retorts, said ore or oil shale rabbling mechanism comprising a gear driven crank shaft, a vertical frame attached to the scraper mechanism of each three retorts in each set of retorts, a cross-head reciprocating vertically in each frame, means including sprocket wheels and a sprocket chain for connecting said two independent scraper mechanisms together, and means for imparting rotary power to the gear driven crank shaft of one of said reciprocating movement scraper operating frames.

3. The combination in a multiple muffled retort ore and oil shale roasting furnace, containing two sets of retorts, means for rabbling and moving the ore oil shale progressively through the retorts of each set of retorts, said means comprising an independent scraper and rabbling reciprocating mechanism arranged to operate each set of retorts, said ore or oil shale rabbling mechanism comprising a gear driven crank shaft, a vertical frame attached to the scraper mechanism of each three retorts in each set of retorts, a cross-head reciprocating vertically in each frame, means including sprocket wheels and a sprocket chain for connecting said two independent scraper mechanisms together, means for imparting rotary power to the gear driven crank shaft of one of said reciprocating movement scraper operating frames, suitable supports for said reciprocating frame, guideways in the end of said furnace and through said supports, and rods secured to said reciprocating frame slidably mounted in the slideways of the rear end of said furnace and in said supports.

4. The combination, in a multiple retort ore and oil shale roasting furnace, containing a plurality of muffled retorts provided with flues under, around and over said retorts, with valve controlled gas exit pipes from each retort, gas receiving pipes extending from the lowest retort to the top retort of said furnace, said gas receiving pipes being connected to said valved gas exit pipes, and a gas receiving tank connected to said gas receiving pipes, means for discharging gas from said gas receiving tank, and with a tank adjacent to said receiving tank provided with a supply of water, a pipe connecting said receiving tank and said water tank, a blower connected to said receiving tank and the pipe leading to said water tank, a gas reservoir tank adjacent to said water tank, and connected to the top of said water tank by a pipe containing a blower and adapted to fill said gas receiving tank with gas from said water tank under pressure, and a system of piping extending from said gas reservoir tank and extending through said furnace into the flues thereof.

5. The combination in a multiple retort ore and oil shale roasting furnace, containing a plurality of muffled retorts provided with flues under, around and over said retorts, with valve controlled gas exit pipes from each retort, said valved controlled pipes being of an elongated rectangular shape where they connect to the interior of the retorts of said furnace and tapering convergingly from their retort ends to a narrow outlet, with a straight line valve connected at one of its ends to the small end of said tapering gas exit pipes, and a gas receiving pipe connected to the opposite end of said straight line valve.

6. The combination in a multiple retort ore and oil shale roasting furnace, containing a plurality of muffled retorts provided with flues under, around and over said retorts, with valve controlled gas exit pipes from each retort, said valve controlled pipes being of an elongated rectangular shape where they connect to the interior of the retorts of said furnace and tapering convergingly from their retort ends to a narrow outlet, with a straight line valve connected at one of its ends to the small end of said tapering gas exit pipes, and a gas receiving pipe connected to the opposite end of said straight line valve, said tapering gas exit pipes being connected to and extending from the opposite sides of each of said retorts at predetermined points in their lengths, and extending through and far enough beyond to enable their valves to be opened and closed from the outside of said furnace, said valves comprising a valve having a cylindrical bore and a round, straight plug form of valve fitting said bore, with a diametrical gas passageway aperture through it, a packed valve stem extending through said cylinder, a hand wheel on said valve stem, said valve being provided with opposite end members adapted to be connected to said tapering gas exit pipes and to said gas receiving pipes.

7. The combination of the furnace and the retorts therein and the flues and fire box and the ore feeding device arranged to feed ore into the upper retort and the discharge spouts at the discharge end of the lowest retort in said furnace, with the gas exit pipes extending from said retorts on their opposite sides through and beyond the brick sides of said furnace, the vertically arranged pipes on the opposite sides of said furnace and the valves connecting said retort exit pipes to said vertical pipes, said vertical pipes being progressively tapered larger from the lowest retort to the upper retort of the furnace, curved pipes connected at one end to the top of said vertical pipes on both sides of said furnace and extending to the central portion of and at a short distance above said furnace, a gas receiving tank member positioned between and connected to the upper ends of the curved pipes of the opposite sides of said furnace, means including a blower, a gas storage tank and a system of piping, the terminal ends of which extend into the flues of said furnace between said retorts and are perforated, and arranged to burn the gas replaced from the ore in said retorts in jets as fuel for heating the said retorts.

8. The combination in a furnace for treating ore or oil shale, of a plurality of muffled retorts arranged one above the other in said furnace with flue spaces arranged in said furnace to heat said retorts, said retorts being provided with a fuel burning fire box and with means including piping, the terminal ends of which extend across said flues and are perforated and discharge and burn the gas as jets, that is replaced from said ore oil shale in said retorts, said retorts each comprising a rectangular shaped long completely enclosed or muffled ore treating chamber forming a retort, and means for drawing the replaced gas from each retort and for returning it to the flues of said furnace and burning it for fuel.

9. The combination in an ore and oil shale treating furnace, comprising a plurality of muffled ore oil shale treating retorts supported one above another and at a predetermined distance apart between suitable supporting walls, and provided with a fuel fire box and with flues surrounding said retorts, each of said retorts comprising a long rectangular box shaped completely enclosed or muffled ore treating chamber member or retort, the opposite sides of which are made of slabs of fire clay, angle iron members secured to the opposite inside faces of said metal sides of each retort, and arranged and adapted to support said floor and roof portions of each of said retorts, gas outlet apertures through the opposite side metal plates of each retort at predetermined points in the lengths of said retorts, gas exit pipes secured to said gas outlets and extending through the walls of said furnace, a valve on the outer ends of said gas exit pipes, and means including gas collecting pipes, a receiving tank, a storage tank, and gas delivering pipes extending into the flues of said furnace for discharging gas into said flues as fuel.

10. In a combined ore and oil shale roasting furnace, the combination of a furnace containing a plurality of muffled retorts, said retorts being provided with walls and flues around and between said retorts, the side and rear end walls of said furnace being constructed of brick, and the front end wall of two independent plates removably secured to the ends of said side walls, and doors in said plates opening to the ends of said retorts, and doors opening into the flues of said furnace.

11. In a combined ore and oil shale roasting furnace, the combination of a furnace containing a plurality of muffled retorts, said retorts being provided with walls and flues around and between said retorts, the side and rear end walls of said furnace being constructed of brick, and the front end wall of two independent plates removably secured to the ends of said side walls, and doors in said plates opening to the ends of said retorts, and doors opening into the flues of said furnace, a plate secured to the rear brick wall of said furnace, a pier projecting from said rear brick wall, a reciprocally ore moving mechanism in each of said retorts, sleeves extending through said rear brick wall, rods connected to said ore moving mechanism extending through said sleeves, a plate on said pier, a power driven reciprocal movement mechanism comprising the brackets, the vertical end bars and the brackets supported on said pier and to the brick wall plate, and connected to the rods of the ore moving mechanism of the three lower retorts, a similar scraper reciprocating mechanism connected to the scraper rods of the three upper retorts and secured to the said rear wall plate, and means including a belt for rotatively operating the reciprocating mechanisms of both groups of retorts simultaneously together in the same direction of their reciprocal stroke movements.

12. In an ore and oil shale roasting furnace of the character described, the combination with the oil shale roasting retorts enclosed within suitable walls arranged to form flues between them, the outer wall of which consists of removable plates provided with removable doors that open into the flues and retorts, said furnace being provided with a fire box and a smoke stack, a feed hopper connected to the upper retort, and discharge chutes at the front end of the lower chamber, of parallel axles in each chamber provided with wheels at their ends and tracks for the same, rabbling scrapers in swinging connection with said axles, and mechanism including a power driven crank shaft for reciprocating said bars.

13. In an ore and oil shale roasting muffled furnace, the combination with roasting retorts, a power operating force feeding and hopper provided ore feeding device connected to the upper retort, two discharge chutes in the lowest retort extending to opposite sides of said furnace at the other end, and means including valved pipes extending from each retort and adapted to convey the gas to the flues of said furnace, of mechanism for moving material through and discharging it from each retort, comprising a wheeled axle form of frame, tracks on the sides of said retort for supporting the same, forwardly inclined scrapers pivotally mounted on the axles of said frame, and stops for limiting the backward swinging movement of said scrapers on their operative stroke, rods extending from said wheeled frame through each retort and beyond said furnace and reciprocating mechanism, including a power driven crank shaft and a reciprocating sliding frame connected to the rods of said scraper mechanism.

In testimony whereof I affix my signature in presence of two witnesses.

ARON M. BEAM.

Witnesses:
G. SARGENT ELLIOTT,
ELIZABETH SMITH.